US011237277B2

(12) United States Patent
Goodrum et al.

(10) Patent No.: US 11,237,277 B2
(45) Date of Patent: Feb. 1, 2022

(54) TECHNIQUES FOR DETERMINING GEOLOCATIONS

(71) Applicant: Horizon Technologies Consultants, Ltd., Reading (GB)

(72) Inventors: Gary Goodrum, Coto de Caza, CA (US); John Beckner, Washington, DC (US); David Saunders, Berkshire (GB)

(73) Assignee: HORIZON TECHNOLOGIES CONSULTANTS, LTD., Reading (GB)

( * ) Notice: Subject to any disclaimer, the term of this patent is extended or adjusted under 35 U.S.C. 154(b) by 363 days.

(21) Appl. No.: 16/278,034

(22) Filed: Feb. 15, 2019

(65) Prior Publication Data

US 2020/0264318 A1  Aug. 20, 2020

(51) Int. Cl.
| | |
|---|---|
| *G01S 19/21* | (2010.01) |
| *G01S 19/51* | (2010.01) |
| *G01S 19/08* | (2010.01) |
| *G01S 19/14* | (2010.01) |
| *G01S 19/31* | (2010.01) |
| *G05D 1/00* | (2006.01) |
| *G05D 1/02* | (2020.01) |

(52) U.S. Cl.
CPC ............... *G01S 19/51* (2013.01); *G01S 19/08* (2013.01); *G01S 19/14* (2013.01); *G01S 19/31* (2013.01); *G05D 1/0022* (2013.01); *G05D 1/0278* (2013.01); *G05D 2201/02* (2013.01)

(58) Field of Classification Search
CPC .......... G01S 19/51; G01S 19/08; G01S 19/14; G01S 19/31; G05D 1/0022; G05D 1/0278
USPC .................................................... 342/357.28
See application file for complete search history.

(56) References Cited

U.S. PATENT DOCUMENTS

| | | | |
|---|---|---|---|
| 3,699,577 A | 10/1972 | Shadle | |
| 3,745,571 A | 7/1973 | Chwastyk | |
| 3,795,911 A | 3/1974 | Hammack | |
| 3,996,590 A | 12/1976 | Hammack | |
| 4,057,800 A | 11/1977 | Ganz | |
| 5,008,679 A | 4/1991 | Effland et al. | |
| 5,317,323 A | 5/1994 | Kennedy et al. | |
| 5,373,236 A | 12/1994 | Tsui et al. | |
| 5,406,291 A | 4/1995 | Guerci et al. | |
| 5,490,079 A | 2/1996 | Sharpe | |

(Continued)

FOREIGN PATENT DOCUMENTS

| | | |
|---|---|---|
| FR | 2922700 A1 | 4/2009 |
| JP | 2013029419 | 2/2013 |
| WO | WO 2014/086588 | 6/2014 |

OTHER PUBLICATIONS

Wypych, Tom et al., "System for Interactive Management of Aerial Imaging Campaigns," Aerospace Conference, 2013 IEEE, Mar. 2, 2013, 7 pages.

*Primary Examiner* — Harry K Liu
(74) *Attorney, Agent, or Firm* — Jones Day

(57) ABSTRACT

The described geolocation techniques determine a location of an earth-based vehicle using a non-geostationary satellite. For instance, the non-geostationary satellite receives signals transmitted by the earth-based vehicle, determines the arrival times of the signals, and the position information of the satellite corresponding to the arrival times of the signals. The arrival times and position information of the satellite are sent to a signal processing unit to determine a location of the vehicle.

24 Claims, 5 Drawing Sheets

(56) References Cited

U.S. PATENT DOCUMENTS

| | | |
|---|---|---|
| 5,534,866 A | 7/1996 | Rose |
| 5,570,099 A | 10/1996 | DesJardins |
| 5,673,305 A | 9/1997 | Ross |
| 5,686,888 A | 11/1997 | Welles |
| 5,734,478 A | 3/1998 | Magome |
| 5,774,087 A | 6/1998 | Rose |
| 5,835,060 A | 11/1998 | Czarnecki |
| 5,874,916 A | 2/1999 | Desjardins |
| 5,914,687 A | 6/1999 | Rose |
| 6,239,748 B1 | 5/2001 | Gilhousen |
| 6,407,703 B1 | 6/2002 | Minter et al. |
| 6,433,740 B1 | 8/2002 | Gilhousen |
| 6,470,097 B1 | 10/2002 | Lai |
| 6,577,272 B1 | 6/2003 | Madden |
| 6,636,721 B2 | 10/2003 | Threadgill |
| 6,677,893 B2 | 1/2004 | Rideout |
| 6,683,568 B1 | 1/2004 | James |
| 6,734,824 B2 | 5/2004 | Herman |
| 6,823,185 B1 | 11/2004 | Comer et al. |
| 6,933,888 B1 | 8/2005 | Schiffmiller et al. |
| 6,959,048 B1 | 10/2005 | Horneman et al. |
| 6,985,454 B1* | 1/2006 | Wiedeman ......... H04B 7/18589 |
| | | 370/316 |
| 7,091,926 B2 | 8/2006 | Kulas |
| 7,116,981 B2 | 10/2006 | Jeon et al. |
| 7,236,119 B2 | 6/2007 | Gounalis |
| 7,256,737 B2 | 8/2007 | Hall |
| 7,342,536 B2 | 3/2008 | Johnson |
| 7,440,762 B2 | 10/2008 | Maloney |
| 7,508,344 B2 | 3/2009 | Stroud |
| 7,561,105 B2 | 7/2009 | Murphy |
| 7,579,989 B2 | 8/2009 | Winterling |
| 7,626,536 B1 | 12/2009 | Rihaczek |
| 7,626,538 B2 | 12/2009 | Rose |
| 7,626,546 B2 | 12/2009 | Chung |
| 7,916,085 B2 | 3/2011 | Kimball |
| 7,917,103 B2 | 3/2011 | Feher |
| 7,925,274 B2 | 4/2011 | Anderson |
| 7,999,739 B2 | 8/2011 | Ferreol et al. |
| 8,004,464 B2 | 8/2011 | Koutsogiannis |
| 8,059,700 B2 | 11/2011 | Lopez-Risueno |
| 8,090,384 B2 | 1/2012 | Alles |
| 8,160,609 B2 | 4/2012 | Alles |
| 8,164,519 B1 | 4/2012 | Bedoya Martinez |
| 8,188,920 B2 | 5/2012 | Thomson |
| 8,193,981 B1 | 6/2012 | Hwang |
| 8,249,622 B2 | 8/2012 | Alles |
| 8,289,210 B2 | 10/2012 | Thomson |
| 8,351,961 B2 | 1/2013 | Olbers |
| 8,380,222 B2 | 2/2013 | Alles |
| 8,477,877 B2 | 7/2013 | Zhou |
| 8,489,122 B2 | 7/2013 | Gravely |
| 8,559,491 B2 | 10/2013 | Chevalier |
| 8,565,798 B2 | 10/2013 | Parker |
| 8,682,182 B2 | 3/2014 | Zhou |
| 8,837,947 B2 | 9/2014 | Gabory |
| 8,861,647 B2 | 10/2014 | Zhou |
| 8,866,672 B2 | 10/2014 | Stroud |
| 8,878,725 B2 | 11/2014 | Lu |
| 8,897,813 B2 | 11/2014 | Hannan |
| 8,908,809 B2 | 12/2014 | Zhou |
| 8,930,088 B2 | 1/2015 | Bauer |
| 8,996,031 B2 | 3/2015 | Austin |
| 9,035,762 B2 | 5/2015 | Cutler |
| 9,086,471 B2 | 7/2015 | Mengwasser |
| 9,086,741 B2 | 7/2015 | Mengwasser |
| 9,203,511 B2 | 12/2015 | Zhou |
| 9,240,628 B2 | 1/2016 | Duncan |
| 9,279,880 B2 | 3/2016 | McCorkle |
| 9,316,719 B1 | 4/2016 | Sternowski |
| 9,331,798 B2 | 5/2016 | Beck |
| 9,523,761 B1 | 12/2016 | Hoffman |
| 9,634,719 B2 | 4/2017 | Rakib |
| 9,661,604 B1 | 5/2017 | O'Shea et al. |
| 9,891,306 B2 | 2/2018 | Wellman |
| 10,057,873 B2 | 8/2018 | O'Shea et al. |
| 10,338,189 B2 | 7/2019 | O'Shea et al. |
| 10,419,106 B1* | 9/2019 | Liu ............... H04B 7/18515 |
| 10,440,677 B2 | 10/2019 | O'Shea et al. |
| 10,466,336 B2 | 11/2019 | O'Shea et al. |
| 10,474,976 B2 | 11/2019 | Clancy et al. |
| 10,739,436 B2 | 8/2020 | O'Shea et al. |
| 10,813,073 B2 | 10/2020 | O'Shea et al. |
| 10,859,668 B2 | 12/2020 | O'Shea et al. |
| 2002/0093963 A1 | 7/2002 | Roullet et al. |
| 2003/0151562 A1 | 8/2003 | Kulas |
| 2004/0027276 A1 | 2/2004 | Herman |
| 2004/0075605 A1 | 4/2004 | Bradford |
| 2004/0189525 A1 | 9/2004 | Beadle |
| 2005/0148346 A1 | 7/2005 | Maloney |
| 2006/0192673 A1* | 8/2006 | Irwin ............... G06Q 10/08 |
| | | 340/539.13 |
| 2006/0273960 A1 | 12/2006 | Murphy |
| 2007/0120738 A1 | 5/2007 | Stroud |
| 2007/0183519 A1 | 8/2007 | Dang |
| 2007/0189404 A1 | 8/2007 | Baum |
| 2008/0021730 A1 | 1/2008 | Holla |
| 2008/0248811 A1 | 10/2008 | Maloney |
| 2009/0079634 A1 | 3/2009 | Rose |
| 2009/0168730 A1 | 7/2009 | Baum |
| 2009/0219202 A1 | 9/2009 | Pon |
| 2009/0267836 A1 | 10/2009 | Falk |
| 2010/0052990 A1 | 3/2010 | Bull et al. |
| 2010/0061427 A1 | 3/2010 | Lopez-Risueno |
| 2010/0220011 A1 | 9/2010 | Heuser |
| 2010/0285769 A1 | 11/2010 | Conroy |
| 2011/0034166 A1 | 2/2011 | Karabinis |
| 2011/0122014 A1 | 5/2011 | Szajnowski |
| 2011/0143772 A1 | 6/2011 | Sridhara |
| 2011/0273334 A1 | 11/2011 | Karr |
| 2011/0280293 A1 | 11/2011 | Chevalier |
| 2012/0178362 A1 | 7/2012 | Fleeter |
| 2012/0252357 A1 | 10/2012 | Tarleton |
| 2012/0258659 A1 | 10/2012 | Emmons |
| 2012/0293371 A1 | 11/2012 | Lu |
| 2012/0320442 A1 | 12/2012 | Gabory |
| 2013/0125176 A1 | 5/2013 | Kahn |
| 2013/0197860 A1* | 8/2013 | Gutt ............... G01S 5/02 |
| | | 702/152 |
| 2013/0203437 A1 | 8/2013 | Whelan |
| 2013/0265198 A1 | 10/2013 | Stroud |
| 2013/0332072 A1 | 12/2013 | Janky |
| 2014/0155085 A1 | 6/2014 | Koseifi |
| 2014/0221005 A1 | 8/2014 | Marshall |
| 2014/0266910 A1 | 9/2014 | Gates |
| 2014/0278214 A1 | 9/2014 | Broad |
| 2014/0361939 A1 | 12/2014 | Duncan |
| 2015/0054639 A1 | 2/2015 | Rosen |
| 2015/0241545 A1 | 8/2015 | Lehtomaki |
| 2015/0268349 A1 | 9/2015 | Veysoglu et al. |
| 2015/0308839 A1 | 10/2015 | Jiang |
| 2015/0319634 A1 | 11/2015 | Zwirn |
| 2015/0326273 A1 | 11/2015 | Rakib |
| 2015/0327085 A1 | 11/2015 | Hadani |
| 2016/0018509 A1 | 1/2016 | McCorkle |
| 2016/0033649 A1 | 2/2016 | Mathews |
| 2016/0036957 A1 | 2/2016 | Van Meter |
| 2016/0043881 A1 | 2/2016 | Forte |
| 2016/0066157 A1 | 3/2016 | Noorshams |
| 2016/0073207 A1 | 3/2016 | Khenkin |
| 2016/0119806 A1 | 4/2016 | Carbajal |
| 2016/0146923 A1 | 5/2016 | McCorkle |
| 2016/0151045 A1 | 6/2016 | Pelissier et al. |
| 2016/0204861 A1 | 7/2016 | Boroson |
| 2016/0204865 A1 | 7/2016 | Boroson |
| 2016/0204866 A1 | 7/2016 | Boroson |
| 2016/0254357 A1 | 9/2016 | Wharton |
| 2016/0278033 A1* | 9/2016 | Wu ............... H04B 7/01 |
| 2016/0299212 A1 | 10/2016 | Broad |
| 2017/0003376 A1 | 1/2017 | Wellman |
| 2017/0006620 A1 | 1/2017 | Reis |
| 2017/0010121 A1 | 1/2017 | Shashua |
| 2017/0102466 A1 | 4/2017 | Petkus et al. |
| 2017/0148340 A1 | 5/2017 | Popa-Simil |

(56) References Cited

U.S. PATENT DOCUMENTS

| | | |
|---|---|---|
| 2017/0164227 A1 | 6/2017 | Zwirn |
| 2017/0264381 A1 | 9/2017 | Mengwasser |
| 2018/0007653 A1 | 1/2018 | O'Shea et al. |
| 2018/0062674 A1 | 3/2018 | Boghrat |
| 2018/0088220 A1 | 3/2018 | Flynn |
| 2018/0109284 A1 | 4/2018 | Hadani |
| 2018/0120443 A1* | 5/2018 | Kandasamy .......... G01S 19/235 |
| 2018/0137601 A1 | 5/2018 | Takazawa |
| 2018/0188381 A1* | 7/2018 | Zhang .................. H04W 4/021 |
| 2018/0205481 A1 | 7/2018 | Shlomo |
| 2018/0284735 A1 | 10/2018 | Cella |
| 2019/0004144 A1 | 1/2019 | O'Shea et al. |
| 2019/0037520 A1 | 1/2019 | O'Shea et al. |
| 2019/0094377 A1* | 3/2019 | Pon ....................... G01S 19/235 |
| 2019/0120928 A1 | 4/2019 | O'Shea et al. |
| 2019/0121665 A1 | 4/2019 | Clancy et al. |
| 2019/0221110 A1* | 7/2019 | Vanderveen ............. H01Q 1/22 |
| 2019/0324110 A1 | 10/2019 | O'Shea et al. |
| 2019/0380105 A1 | 10/2019 | O'Shea et al. |
| 2020/0064434 A1 | 2/2020 | O'Shea et al. |
| 2020/0175450 A1 | 6/2020 | Clancy et al. |
| 2020/0411998 A1 | 12/2020 | Mast et al. |
| 2021/0013615 A1 | 1/2021 | Mast et al. |
| 2021/0056852 A1* | 2/2021 | Lund .................... G08G 1/0112 |
| 2021/0120514 A1 | 4/2021 | O'Shea et al. |
| 2021/0190896 A1 | 6/2021 | O'Shea et al. |

* cited by examiner

TECHNIQUES FOR DETERMINING GEOLOCATIONS

TECHNICAL FIELD

The following disclosure relates to systems, methods, and devices for determining geolocations.

BACKGROUND

A target vehicle's location can be determined by detecting and locating signals from an emitter onboard the target vehicle. In particular, a conventional technique known as the "direction finding (DF) technique" uses directional antennas to create lines of positions (LoPs) to signal sources. The DF technique requires these LoPs to be taken from multiple measurement vehicles that have known locations. The locations of these measurement vehicles along with the created LoPs are then used to determine a Position Fix (PF), a location determine in two-dimension space, of the emitter onboard the target vehicle. The conventional DF technique, however, introduces errors to the determined PF when the target vehicle's emitter moves between the LoP measurements. This error can be eliminated by configuring the multiple measurement vehicles to take LoPs simultaneously. But, using multiple measurement vehicles can increase the cost of operation. For example, to obtain multiple measurements, a system employing the conventional DF technique may require two or three vehicles that can measure a signal transmitted from a signal source on the target vehicle. Furthermore, multiple vehicles can have a limited duration of operation, in part, because vehicles have a limited fuel range.

Another conventional technique for determining a target vehicle's location is known as "Blind Coherent Integration." This technique involves multiple measurement vehicles that are configured to receive signals, including ones emitted by the target vehicle. The signals received at each of the sensing devices are added together after compensating for time delay and doppler frequency offset associated with each signal. The summation process causes the signals from the same target vehicle to be coherently added, becoming strengthened, while other signals are added incoherently, becoming canceled due to randomness of the time delays and doppler frequency offsets. The resulting signal after the summation process can be used to determine the location of the target vehicle.

SUMMARY

The disclosed techniques can use a single non-geostationary satellite, such as a CubeSat, to determine a geolocation of an earth-based vehicle (e.g., a boat, a ship, or a truck) in three-dimensions on the earth's surface by detecting a signal transmitted by an emitter on the earth-based vehicle. Based on the determined location, the satellite can directionally or timely transmit a signal to control the earth-based vehicle for an autonomous driving application.

A system for performing geolocation can include a non-geostationary satellite and a signal processing unit. The non-geostationary satellite may orbit earth in a non-geostationary path, such as in a low-earth orbit (LEO), a medium-earth orbit (MEO), a high-earth orbit (HEO), or a Molniya orbit. The non-geostationary satellite includes a data collection apparatus with a processor that receives a number of signals from an earth-based vehicle and determines their arrival times, and obtains the non-geostationary satellite's position information corresponding to the signals' arrival times. The data collection apparatus also sends, to a signal processing unit, the arrival times and the position information of the non-geostationary satellite corresponding to the received signals.

Upon receiving the arrival times and positioning information, the signal processing unit is configured to determine a location of the earth-based vehicle. The signal processing unit uses the received information to select a plurality of candidate locations to determine the location of the earth-based vehicle. The signal processing unit also determines, for each candidate location and based on the arrival times and the position information, an error value representing the proximity between a candidate location and the location of the earth-based vehicle. The signal processing unit selects, from the plurality of candidate locations associated with a plurality of error values, one candidate location having a lowest error value, which determines the location of the earth-based vehicle.

In other aspects, the above-described methods can be embodied in the form of processor-executable code and stored in a computer-readable program medium.

A device that is configured or operable to perform the above-described methods is also disclosed.

The above and other aspects and their implementations are described in greater detail in the drawings, the descriptions, and the claims.

DETAILED DESCRIPTION

The techniques for determining a geolocation described herein can be used to gather positional information about a moving or stationary vehicle through passive detection of signals transmitted by a signal source on the vehicle. A geolocation system can be installed and operated on a space-based vehicle, such as a non-geostationary satellite to detect signals transmitted from an earth-based vehicle operating a signal source. The non-geostationary satellite may orbit earth in a non-geostationary path, such as in a LEO, a MEO, a HEO, or a Molniya orbit. Based on the signals detected by the satellite, a signal processing unit can use the disclosed techniques to determine the geolocation of an earth-based vehicle. The signal processing unit can be located on the satellite, or on a remote platform which may be moving (e.g., aircraft), or stationary (e.g., on the earth). Thus, a single satellite can use the technologies described herein to perform measurements that in turn are used by a signal processing unit to determine the geolocation of an earth-based vehicle. Unlike conventional techniques that uses multiple measuring vehicles (e.g., multiple aircrafts) to determine a location of a signal source in two-dimensions, the disclosed technology can use a single satellite to determine of a location of an earth-based vehicle in three-dimensions.

LEO satellites can operate at an altitude from about 100 miles to approximately 1,240 miles above the earth's surface. LEO has an orbit with period of approximately less than 128 minutes. LEO may be an elliptical orbit or a circular orbit. For a circular orbit, an LEO may have a maximum altitude of approximately 1269 miles and a minimum altitude of approximately 124 miles. Since a LEO satellite moves at relatively fast speeds over the ground (e.g., approximately 14,430 mph to 17,450 mph for a circular orbit), multiple measurements can be taken by the same LEO satellite from different locations faster than what is possible using an aircraft-mounted conventional measurement system. The speed of the LEO (and similarly MEO, HEO, or Molniya orbit) satellite can be considered relatively fast when compared to a speed of a moving or stationary earth-based vehicle.

As an example, a geolocation system on an non-geostationary satellite can include a wide-spectrum or bandwidth capability because operating frequencies of signal sources are initially unknown, a wide dynamic range because signal strength is initially unknown, a narrow bandpass to discriminate the signal of interest from other signal sources on nearby frequencies, and/or a capability to measure an angle-of arrival to obtain bearings to locate the transmitter. The bandwidth of the geolocation system on the non-geostationary satellite can be designed to receive signals transmitted within a frequency spectrum that ranges from approximately 30 MHz to approximately 50 GHz.

Figure 1:
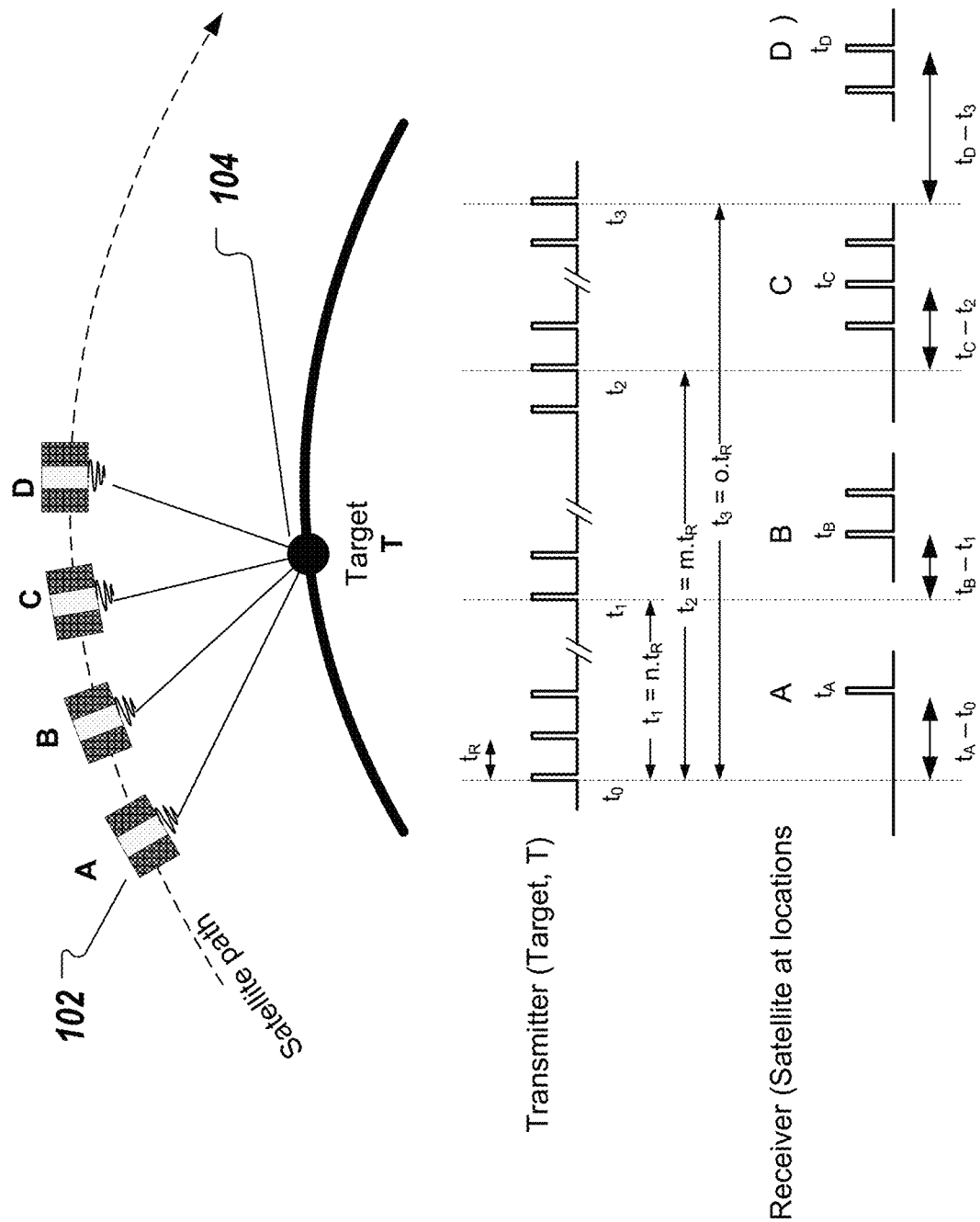
FIG. 1 shows an example of a technique for determining a geolocation using a single moving satellite.

FIG. 1 shows an example of a geolocation technique using a single moving satellite. Satellite 102 is a single non-geostationary satellite that operates and moves in a non-geostationary orbit. A non-geostationary satellite can travel in an orbit around the earth at a speed faster than the earth's rotation. FIG. 1 shows the satellite 102 traversing or moving along a known dotted satellite path from position A to B to C to D.

In this example, the satellite 102 includes one or more antennas and a receiver that can be configured to receive signals emitted in a frequency range of 30 MHz to 50 GHz. Specifically, in some embodiments, the antenna and receiver of the satellite 102 can be configured to receive signals emitted in a frequency range of 2 GHz to 18 GHz. Several signal sources operate at frequencies between 2 GHz and 18 GHz. Some examples of a satellite 102 operating in a non-geostationary orbit include a CubeSat or a NanoSat. A CubeSat is a small form factor satellite that may include several systems to operate the CubeSat for variety of purposes. For instance, a CubeSat may include a power source, such as a battery and/or solar panels, a communication system (e.g., an antenna), and additional electronics (e.g., signal processors or sensors). A NanoSat may be smaller in size compared to a CubeSat and may include many of the systems included in the CubeSat.

Target location T represents a location of an earth-based vehicle 104, such as a ship, or a truck. The four lines drawn between the satellite 102, when it is at positions A, B, C, and D, and the earth-based vehicle 104, represent signals that are transmitted from a signal source operating on the earth-based vehicle 104 and that are received by the satellite 102. For example, the four lines can represent signals from a ship's signal source system signature. Additional signals that may be received in-between locations A, B, C, and D are omitted from FIG. 1 for the sake of clarity. The geolocation techniques described in this patent document can determine the target location T in three-dimensions.

The non-geostationary satellite 102 can be considered relatively fast (when compared to a speed of a relatively slowly moving or stationary earth-based vehicle 104), which is a beneficial feature for determining geolocation. A conventional aircraft-based system can be susceptible to large errors in determining location of a vehicle in scenarios where the aircraft-based system measures the received signals from the vehicle that moves during the time period when the measurements are taken. The small difference in speeds between the flying aircraft and the moving vehicle can introduce errors in location accuracy. In contrast, the large difference in speeds between a fast-moving non-geostationary satellite 102 and a relatively slowly moving or stationary earth-based vehicle 104 is beneficial, at least because the non-geostationary satellite 102 can receive multiple signals from the earth-based vehicle 104 whose relatively slow speed minimizes the errors in determining the vehicle 104's location. As further explained below, the information associated with multiple signals can be processed by a signal processing unit to locate a position or location of the earth-based vehicle 104, which is different from the conventional technique of correlating bearings.

In FIG. 1, the earth-based vehicle 104 may be located at an unknown target location T on the earth's surface. The bottom half of FIG. 1 shows two related timing diagrams. The top timing diagram illustrates the Target (or earth-based vehicle 104) transmitting signals several times including at times $t_0$, $t_1$, $t_2$, $t_3$, etc., The difference between the signals transmitted by the vehicle 104 is shown as $t_R$. The time difference between $t_0$ and $t_1$ can be described as $t_1=n*t_R$, the time difference between to and $t_2$ can be described as $t_2=m*t_R$, and the time difference between to and $t_3$ can be described as $t_3=o*t_R$. The variables n, m, and o may be integer values.

In timing diagram example of FIG. 1, $t_R$ is constrained by the signal source on the vehicle 104 and can be a constant or may have an unknown value. In some cases where $t_R$ is irregular but deterministic, the location determination techniques described in FIG. 3 below can be used to determine location of the earth-based vehicle 104. For the case of a signal source, the repetition period $t_R$, is a signature of the signal source used by the vehicle 104. The transmit signals could be single or multiple depending on the signal sweep rate (rotation rate) or pulse repetition rate (PRR) of the multiple signals. The sweep rate, PRR and individual radio frequency (RF) signal pulse width are functions of a particular signal source set. Other signals with known or deterministic properties can also be received and processed to determine location of the earth-based vehicle.

The bottom timing diagram in FIG. 1 illustrates the satellite 102 receiving at least some of the signals transmitted by the earth-based vehicle 104 at satellite locations A, B, C, and D. For instance, the signals transmitted by the vehicle 104 at to is received by the satellite 102 at time of arrival $t_A$ and at satellite location A, the signal transmitted by the vehicle 104 at $t_1$ is received by the satellite 102 at time of arrival $t_B$ and at satellite location B, and so on. The time differences $t_A$-$t_0$, $t_B$-$t_1$, and so on are the difference in time between when the transmitter transmits a signal and the receiver receives that same signal. The signals received at times $t_A$, $t_B$, $t_C$, $t_D$ need not be from consecutive transmitted signals.

The satellite 102 may include a Global Positioning System (GPS) device that provides information about positions A, B, C, and D of the satellite 102 when the satellite 102 received the signals from the earth-based vehicle 104. As further described in FIG. 3 below, a signal processing unit processes the signals received by the satellite 102 to determine a target location T in three dimensions.

Figure 2:
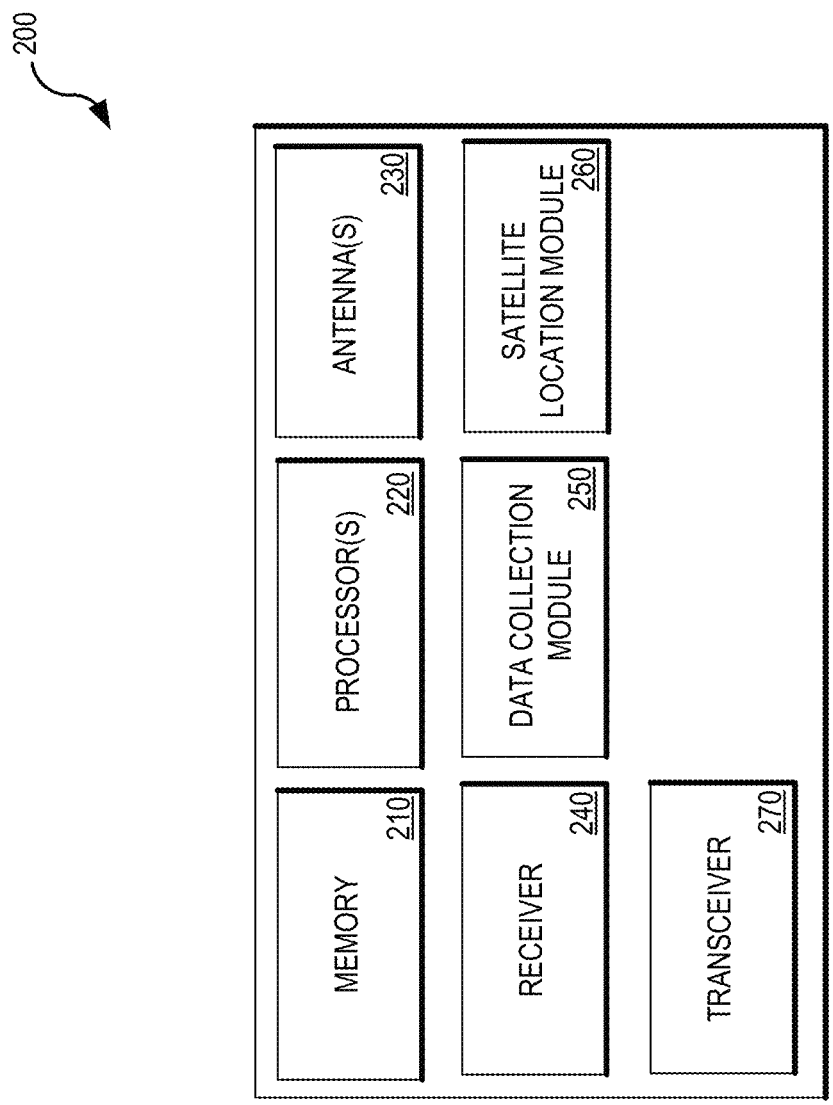
FIG. 2 is a block diagram of an example of a data collection apparatus that receives and processes received signals.

FIG. 2 is a block diagram illustrating an example of a data collection apparatus located on or in an non-geostationary satellite that may orbit in a non-geostationary orbit, such as in a LEO, MEO, HEO, or Molniya orbit. The data collection apparatus 200 includes one or more processors 220 that can read code from the memory 210, and perform operations associated with the other blocks or modules shown in FIG. 2. The data collection apparatus 200 includes one or more antennas 230 and a receiver 240 configured to receive the transmitted signals. For example, the receiver 240 can receive the signals at times $t_A$, $t_B$, $t_C$, $t_D$, etc., as mentioned in FIG. 1 while the non-geostationary satellite moves in between each received signal.

Based on the received signals, the data collection module 250 collects data associated with the received signals. For example, referring to the signal received by the data collection apparatus 200 at position A in FIG. 1, the data collection module 250 obtains the time $t_A$ when the signal was received. The data collection module 250 also obtains information regarding the location of the non-geostationary satellite 102 at position A from a satellite location module 260 (e.g., GPS chip or a position location determination device, such as inertial guidance or derived from other externally provided positional information available to it). The satellite location module 260 can calculate satellite location from data or information available externally to the satellite. The satellite may, for example, have ephemeris data information uploaded to it from which the satellite location module 260 could calculate the satellite's position at the time of arrival of a signal. The satellite location module 260 can have information based on signal source location information (e.g., ground signal-source information) uploaded to it from which to calculate the satellite's position. The data collection module 205 also collects timing and satellite position data associated with each signal received at times $t_B$, $t_C$, and $t_D$, and any additional signals.

Figure 3:
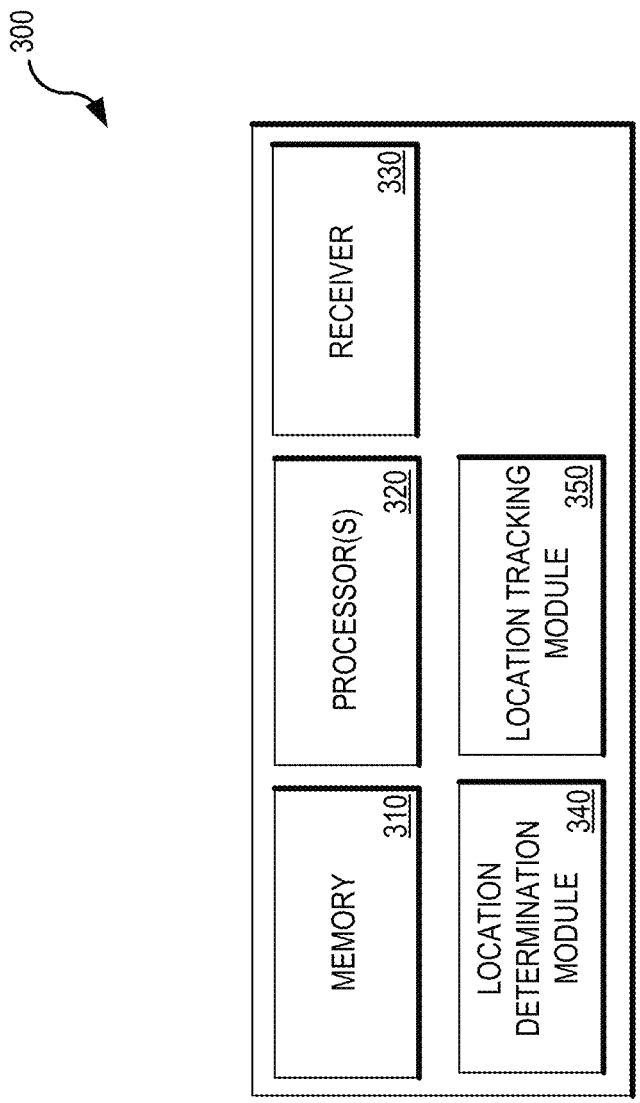
FIG. 3 shows a block diagram of an example of a signal processing unit that can determine a location of an earth-based vehicle.

The data collection apparatus 200 also includes a transceiver 270 (or other receivers and transmitters) with which the satellite 102 can communicate with a stationary platform (e.g., ground-based computing device located on earth) or with a moving remote platform (e.g., an aircraft). The computing device can communicate to the satellite 102 via the transceiver 270 to instruct the data collection module 250 to collect data associated with the received signals (e.g., arrival times and/or position information of the satellite) or to send that data to the computing device. In some embodiments, the transceiver 270 can be combined with the receiver 240 (e.g., may be the same device) so that the transceiver 270 can perform the operations associated with the receiver 240. The data collection module 250 is configured to collect and/or send data associated with the received signals in response to receiving an instruction from the computing system located on a stationary platform (e.g., ground-based on the earth) or located on a remote moving platform (e.g., an aircraft). The computing device can send the data received from the data collection module 250 to a signal processing unit (as shown in FIG. 3) that can determine the location of the earth-based vehicle 104. The signal processing unit can be located in a stationary platform (e.g., the ground-based computing system on earth) or the signal processing unit can be located on or in a moving remote platform-based computing device. In some other embodiments, the satellite 102 can include a signal processing unit (as shown in FIG. 3) that can determine a location of the earth-based vehicle 104. In embodiments where the signal processing unit is included in the satellite 102, the determined location of the earth-based vehicle 104 is sent to the computing device in a stationary platform (e.g., a ground-based computing device located on earth) or in a moving remote platform.

FIG. 3 shows an example of a signal processing unit that can determine a location of an earth-based vehicle. The signal processing unit 300 may include one or more processors 320 that can read code from the memory 310, and perform operations associated with the other blocks or modules of the signal processing unit 300. In embodiments where the data collection apparatus 200 and signal processing unit 300 are located on or in an non-geostationary satellite, the memory 210 and 310 may be the same and the processor(s) 330 and 330 may be the same.

The signal processing unit 300 includes a location determination module 340 that obtains signal timing (e.g., arrival time) and satellite position data from the data collection module 250. In embodiments where the signal processing unit 300 is located on a stationary platform (e.g., ground-based on the earth) or on a moving remote platform (e.g., an aircraft), the receiver 330 receives the signal timing and satellite position data from the data collection module 250. Based on the received timing and position data, the location determination module 340 determines the location of the earth-based vehicle 104 using the techniques described below.

The location determination module 340 can determine the location of the earth-based vehicle 104 based on the operations described below. A detailed explanation of the computations, relevant equations, and additional operations to determine location of the earth-based vehicle is described after the operations described below (and elsewhere in this patent document).

The location determination module 340 chooses a candidate location and determines a first set of path lengths between the candidate location and each satellite position data associated with a received signal (as explained in FIG. 1). For instance, the first set of path lengths may be obtained by determining a magnitude of the vector between the candidate location and each of the satellite position data.

The location determination module 340 also determines a second set of path lengths between a location of the earth-based vehicle 104 and each satellite position data. For instance, the second set of path lengths may be obtained by multiplying the speed of light with the arrival time of each signal.

Next, the location determination module 340 obtains two error values. The first error value (described as path length error value below) is obtained by comparing path lengths from the first set with the corresponding path lengths from the second set. The second error value (described as earth-radius error value below) is obtained by taking the difference between the radius of the earth known at the latitude and longitude associated with the candidate location and the magnitude of the radius of the candidate location determined from the same reference point, e.g., the center of the earth. The two error values are combined to obtain a total error that characterizes the proximity between the candidate location and the actual location of the earth-based vehicle 104.

The operations described above can be repeated by using additional candidate location values to obtain total error values corresponding to the additional candidate locations. The candidate location associated with the lowest total error is select as the best determine of the location of the earth-based vehicle 104.

Referring to FIG. 1, the values for variables $t_0$, $t_R$ and Target location T are unknown. In the timing diagram example shown in FIG. 1, the satellite 102 can obtain four measurements, for example, four satellite position and four arrival times related to the signals received at times $t_A$, $t_B$, $t_C$, $t_D$. Based on the satellite position and timing data, the location determination module 340 uses Equation (1) to determine target location T.

$$(|TD|-|TB|)-(|TC|-|TA|)=c\times[t_D-t_B-(t_C-t_A)] \quad \text{Equation (1)}$$

where "c" is the speed of light, |TA| is the magnitude of the vector TA, which is the path length or distance from T to A, |TB| is the magnitude of the vector TB, which is the path length from T to B, and so on. The variables n, m and o (as shown in FIG. 1) are integers that relate to the transmit times $t_1$, $t_2$, and $t_3$, respectively, from Target T. As mentioned above, the scenario in FIG. 1 shows that there are three unknown quantities: $t_0$, $t_R$, and target location T.

The location determination module 340 can eliminate to and $t_R$ by an example algebraic manipulation as shown in Equation (1) below, leaving the target location T as the only unknown. Thus, in some embodiments, as explained for Equation (1), a signal processing unit 300 uses at least four received signals to solve for the target location T.

In some other embodiments, to and $t_R$ can be eliminated using only three measurements, $t_A$, $t_B$ and $t_C$. Thus, Equation (1) becomes Equation (2) below.

$$(|TC|-|TB|)-(|TB|-|TA|)=c\times[t_C-2\cdot t_B+t_A] \quad \text{Equation (2)}$$

Thus, in some embodiments, as explained for Equation (2), a signal processing unit 300 uses at least three received signals to solve for the target location T.

A benefit of using Equation (1) to determine target location T is that Equation (1) can eliminate to and the repetition period, $t_R$ without knowing the values of to and $t_R$. Similarly, Equation (2) can be used to determine target location T so that Equation (2) can eliminate to and the repetition period, $t_R$ without knowing the values of to and $t_R$.

To determine a target location T in three dimensions, the location determination module 340 can select a candidate target location, T'. The candidate target location T' can be associated with a latitude, a longitude, a height at or above the surface of the earth. The latitude and longitude of T' may be based on a reference system known as World Geodetic System 1984 (WGS 1984). An example of an initial target height is sea level. Candidate target location T' can be selected based on a number of factors such as the range of elevation (e.g., 0 to 30 degrees) from the earth-based vehicle to the satellite that receives the signals, or the doppler frequency of the received signals.

Next, the location determination module 340 constructs a path length error function as shown in Equation (3) below for embodiments using at least four received signals. In some embodiments, the location determination module 340 constructs a path length error function as shown in Equation (4) below using at least three received signals.

$$|T'D|-|T'B|-(|T'C|-|T'A|)-c\times[t_D-t_B-(t_C-t_A)]=\varepsilon_p \quad \text{Equation (3)}$$

$$|T'C|-|T'B|-(|T'B|-|T'A|)-c\times[t_C-2t_B+t_A]=\varepsilon_p \quad \text{Equation (4)}$$

where $\varepsilon_p$ is a value that describes or represents the path length error, |T'A| is the magnitude of the vector T'A, which is the path length or distance from T' to A, |T'B| is the magnitude of the vector T'B, which is the path length from T' to B, and so on. As an example, |T'D| can be determined by converting the latitude and longitude of T' to geocentric cartesian coordinates (e.g., (x, y, z) which may be translated into <radius, latitude, longitude>), where T' is the vector (x, y, z). Similarly, the latitude and longitude of D obtained from GPS coordinates for example are converted to geocentric cartesian coordinates to obtain vector D. T'D is the vector between T' and D, and |T'D| is the magnitude or length of the vector that describes or represents the distance between T' and D.

As shown in Equations (3) and (4), the path length error value $\varepsilon_p$, is the difference between (i) the path lengths from a candidate location, T' to the locations of satellite (e.g., as calculated from the satellite's locations relative to candidate location T' at the observation time (e.g., |T'D|−|T'B|−(|T'C|−|T'A|) for Equation (3)) and (ii) the path length calculated from the time of arrival of the signals received from target location T (e.g., $c\times[t_D-t_B-(t_C-t_A)]$ for Equation (3)). The path lengths |T'A|, |T'B|, |T'C|, and/or |T'D| can be considered a set of path lengths between the candidate location T' and each position of the non-geostationary satellite. Furthermore, the path lengths ($c\times t_A$), ($c\times t_B$) or ($c\times 2t_B$), ($c\times t_C$), and/or ($c\times t_D$) can be considered another set of path lengths between the location of the earth-based vehicle and each position of the non-geostationary satellite.

Equation (3) is the same as Equation (5) shown below. Equations (3) and (5) can be solved by first determining for each satellite location (e.g. positions A, B, C, D) a difference between a path length associated with a candidate location T' and a path length associated with signals received from target location T (e.g., (|T'D|−$c\times t_D$), (|T'B|−$c\times t_B$), (|T'C|−$c\times t_C$), (|T'A|−$c\times t_A$)). Next, path length error value $\varepsilon_p$, is determined by subtracting the differences between the path lengths associated with positions B, C, and D and by adding the difference between the path length associated with position A.

$$(|T'D|-c\times t_D)-(|T'B|-c\times t_B)-(|T'C|-c\times t_C)+(|T'A|-c\times t_A) =\varepsilon_p \quad \text{Equation (5)}$$

Similarly, Equation (4) is the same as Equation (6) shown below.

$$(|T'C|-c\times t_C)-(2|T'B|-c\times 2t_B)+(|T'A|-c\times t_A)=\varepsilon_p \quad \text{Equation (6)}$$

The location determination module 340 can minimize the path error value for Equations (5) or (6) by iterating candidate values of T' using Equation (8) as described below. By minimizing the path length error value, the location determination module 340 can determine the target location T in three dimensions.

Next, the location determination module 340 can use another error function to determine the target location T in a third dimension, such as height. Since the Target position, T, is constrained to be on or near to the earth surface, the location determination module 340 can construct an example earth-radius error function as shown below in Equation (7), where $\varepsilon_r$ is a value that describes or represents the earth-radius error, |T'| is the length of the vector T' can be determined from a reference point (0, 0, 0) in geocentric coordinates (i.e., center mass of earth). |T'| describes the magnitude of the radius of the candidate location T', which can be determined by taking the square root of the sum of the squares of the cartesian coordinates of T', i.e., square root ($x^2+y^2+z^2$). The earth-radius error value $\varepsilon_r$ can be the radial difference between the length of the vector T' and the earth's radius, $r_e$. The earth's radius $r_e$ is determined at the latitude and longitude location associated with candidate location T' (as given by, e.g., WGS-84) and can be determined from a reference point (0, 0, 0).

$$|T'|-r_e=\varepsilon_r \quad \text{Equation (7)}$$

Next, the location determination module 340 can combine the two sets of error quantities obtained from the path error and earth radius error function values in a mean squared error (MSE) form as shown in Equation (8).

$$mse=\varepsilon_p^2+(k\times\varepsilon_r^2) \quad \text{Equation (8)}$$

where k is a scale factor or a weighting value. In some embodiments, k may have a pre-determined value, such as 1. The MSE provides a value that can characterize the proximity or the closeness between the candidate location T' and the actual target location T. Thus, the MSE can quantify whether the candidate location T' is a good determine of the target location T. Thus, a low value for MSE indicates that the candidate location T' is close to the actual target location T.

The location determination module 340 can minimize the combined error quantities to determine a best determine of the target location T in three dimensions. The location determination module 340 can determine the best determine of target location, T, by iterating candidate values of T' and by using the set of measurements taken by the satellite for a vehicle located at target location T. For example, the location determination module 340 can repeat Equations (6) to (8) (or Equations (5), (7), and (8)) two times by using two different values of T' (e.g., a first T' and a second T') and by using the same set of measurements taken by the satellite for a vehicle located at target location T to provide a first MSE for the first T' and a second MSE for the second T'. In this example, the location determination module 340 can select either the first or the second T' that has the lowest MSE. In some embodiments, the location determination module 340 may iterate the candidate values of T' many times (e.g., four times) to provide a best determine of the target location T. In some example embodiments, the location determination module 340 may iterate candidate values of T' to determine of Target location, T by using a minimization technique such as a Down Hill Simplex method.

The signal processing unit 300 may include a location tracking module 350 that can store the candidate location T' that best determines the target location T of the earth-based vehicle determined by the location determination module 340. A benefit of storing the best determine of the target location T is that it can provide a history of the determined location(s) of the earth-based vehicle. A ground-based or remote platform-based computing device may use the location history of the earth-based vehicle to plot a map that shows the various locations of the earth-based vehicle at different times.

In some embodiments, to enhance the accuracy of the determine of the target location T, the location determination module 340 can repeat the operations described above in the context of Equations (1) to (8) using additional position and timing measurements that may be obtained by the satellite in sequence. As explained above, a location determination module 340 can use the four measurements described in FIG. 1 (related to satellite locations A, B, C, and D) to determine a target location T. In some cases, the satellite 102 may receive additional signals from vehicle 104 at additional satellite locations E, F, G, H (not shown in FIG. 1). In such cases, the determine of the target location T can be improved by using information associated with the additional signals. For example, the location determination module 340 can use the four measurements related to satellite location B, C, D, and E to obtain another determine of the target location T. In another example, the location determination module 340 can use the four measurements related to satellite location E, F, G, and H to obtain another determine of the target location T.

The techniques described in this patent document can be used to determine a location of an earth-based vehicle (e.g., boat, ship, or truck) based on timing and position measurement data associated with signals received by a receiver on a non-geostationary satellite. For example, based on the signals transmitted by a signal source on a vehicle, the location determination module 340 can determine a location of the ship from which the signal source is operating. In some embodiments, the techniques described in this patent document can be extended to a multi-satellite system involving multiple non-geostationary satellites. Since a satellite moves fast compared to a slowly moving earth-based vehicle, a single satellite travelling around the earth cannot receive signals from a vehicle located on the earth at all times. In a multi-satellite system, each non-geostationary satellite can be configured to obtain multiple measurement data as described in this patent document. Each non-geostationary satellite can orbit the earth at some distance from another non-geostationary satellite so that the multiple satellites can form multiple rings of moving satellites orbiting the earth. The location determination module 340 of the signal processing unit can obtain the multiple measurement data from each satellite to determine location of an earth-based vehicle operating a signal source. A benefit of the multi-satellite system is that it can allow a signal processing unit to continuously determine the location of a moving or stationary earth-based vehicle operating a EM source.

Figure 4:
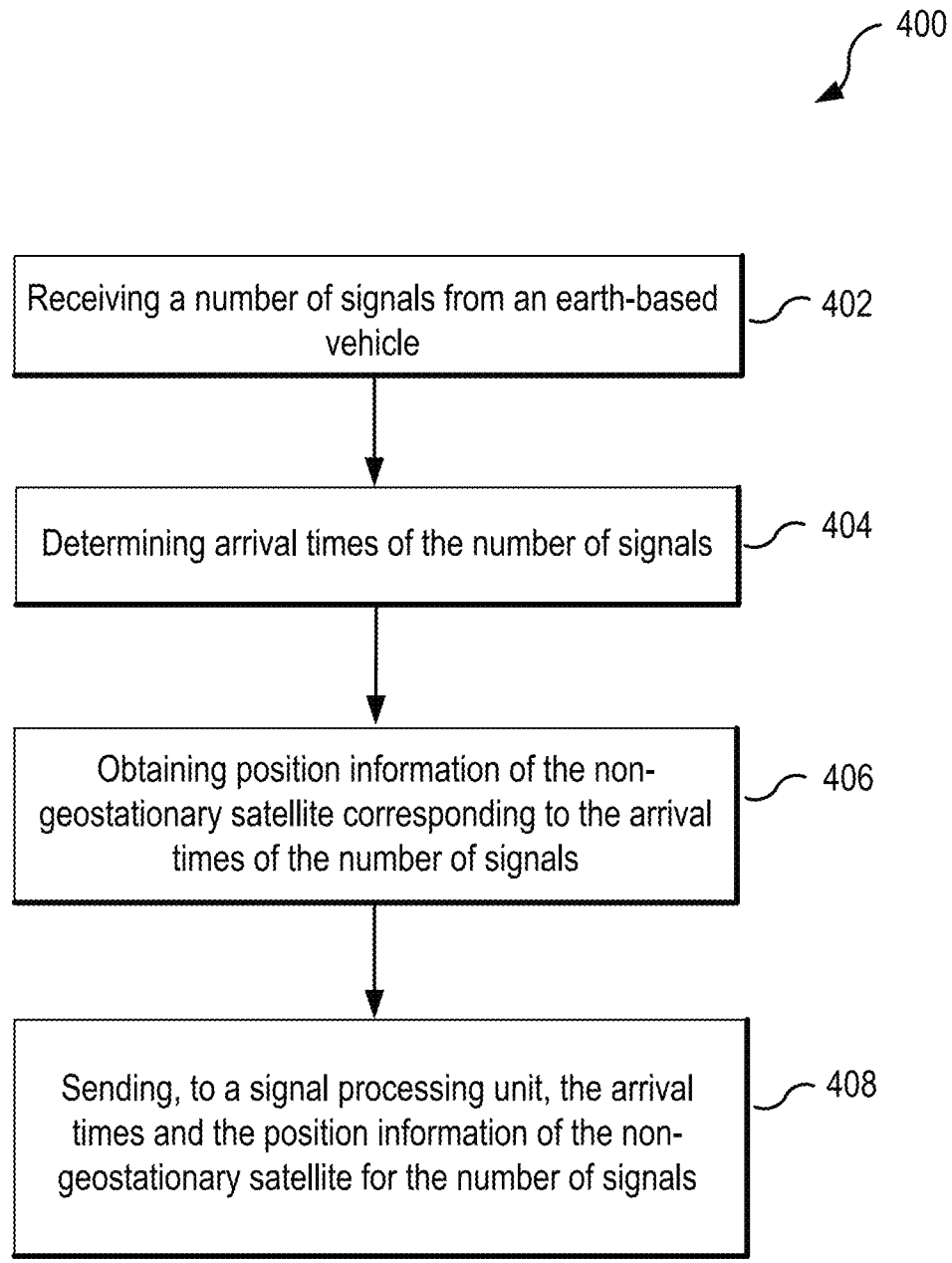
FIG. 4 shows an example flow diagram for receiving and processing received signals.

FIG. 4 shows an example flow diagram for receiving and processing signals by a data collection apparatus. At the receiving operation 402, a data collection apparatus on a non-geostationary satellite receives a number of signals from an earth-based vehicle. The non-geostationary satellite may orbit earth in a non-geostationary orbit, such as in a LEO, MEO, HEO, or Molniya orbit. In some embodiments, the number of signals is at least three.

For each received signal, the data collection apparatus determines an arrival time and a position information of the non-geostationary satellite. At the determining operation 404, the data collection apparatus determines arrival times of the number of signals. At the obtaining operation 406, the data collection apparatus obtains position information of the non-geostationary satellite corresponding to the arrival times of the number of signals. The determining operation 404 and the obtaining operation 406 may be performed after each signal has been received. In some embodiments, the position information of the non-geostationary satellite is obtained from a global positioning system (GPS) device located on the non-geostationary satellite.

At the sending operation 408, the data collection apparatus sends, to a signal processing unit, the arrival times and the position information of the non-geostationary satellite for the number of signals. In some embodiments, the data collection apparatus may send each arrival time and position information to a signal processing unit as the data collection apparatus receives and processes each signal. In some other embodiments, the data collection apparatus may send a group of arrival times and position information (e.g., a set of 3 or 4 of arrival times and a set of 3 or 4 position information) to a signal processing unit after the data collection apparatus receives and processes a number of signals (e.g., 3 or 4). In some embodiments, the data processing apparatus is configured to perform the determining operation 404, the obtaining operation 406, or the sending operation 408 in response to receiving an instruction from a ground-based or remote platform-based computing system.

In some embodiments, the data collection apparatus may include a processor and a memory that may include instructions stored thereupon. The instructions upon execution by the processor configure the data collection apparatus to perform the operations described in FIGS. 2 and 4 and in the embodiments described in this patent document.

Figure 5:
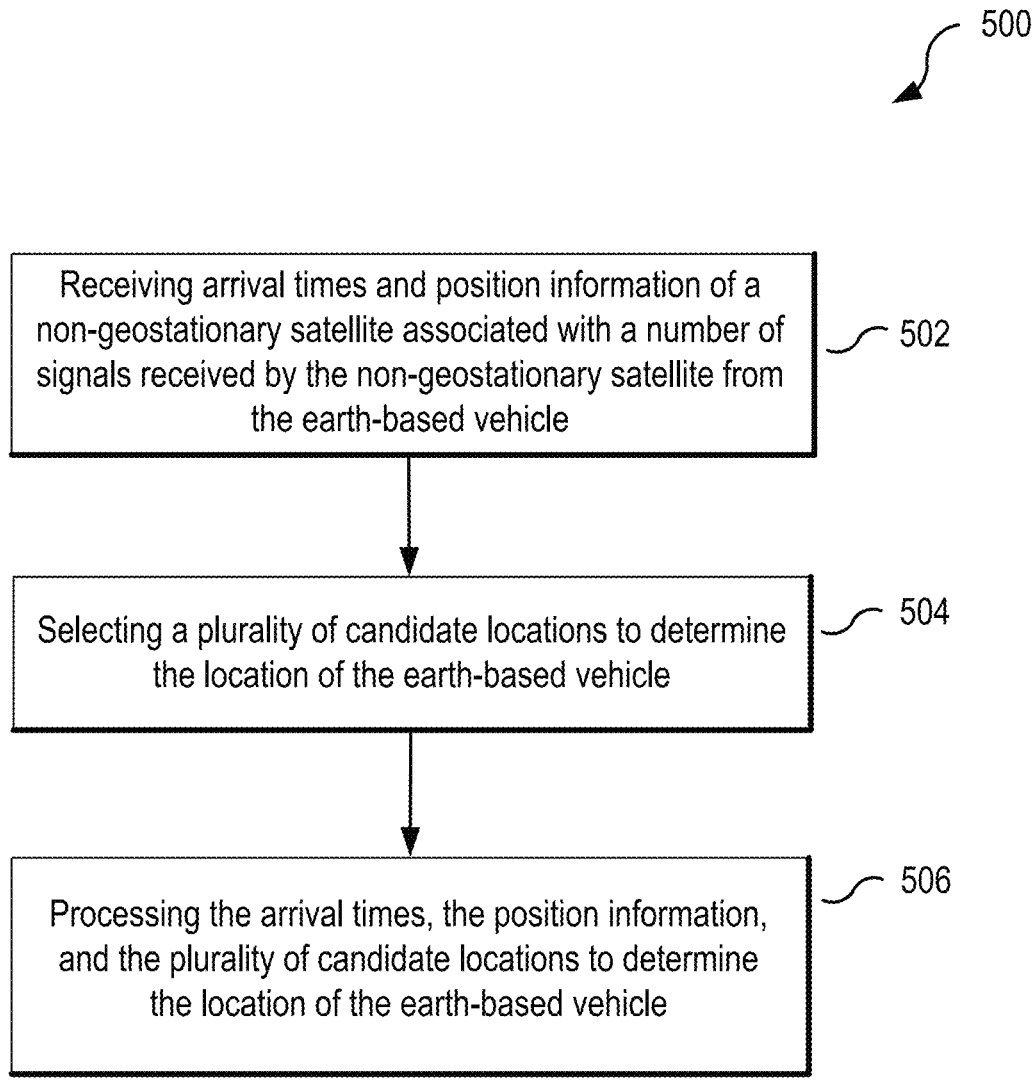
FIG. 5 shows an example flow diagram for determining a location of an earth-based vehicle.

FIG. 5 shows an example flow diagram for determining a location of an earth-based vehicle by a signal processing unit. At the receiving operation 502, the signal processing unit receives arrival times and position information of a non-geostationary satellite associated with a number of signals received by the non-geostationary satellite from the earth-based vehicle. In some embodiments, the signal processing unit is located in a ground-based or in a remote platform-based computing system.

At the selecting operation 504, the signal processing unit selects a plurality of candidate locations (e.g., four candidate locations) to determine the location of the earth-based vehicle.

At the processing operation 506, the signal processing unit processes the arrival times, the position information, and the plurality of candidate locations to determine the location of the earth-based vehicle. The processing of the arrival times, position information, and candidate locations can be performed by determining, for each candidate location and based on the arrival times and the position information, an error value that describes or represents a proximity between a candidate location and the location of the earth-based vehicle. In some embodiments, the error value is determined for each candidate location by the signal processing unit configured to
  (i) determine a first set of path lengths between the candidate location and each position information of the non-geostationary satellite,
  (ii) determine a second set of path lengths between the location of the earth-based vehicle and each position information of the non-geostationary satellite,
  (iii) obtain a first error value based on differences between path lengths from the first set of path lengths and corresponding path lengths from the second set of path lengths for each position information of the non-geostationary satellite,
  (iv) obtain a second error value based on a difference between earth's radius at a latitude and a longitude associated with the candidate location and a magnitude of the candidate location's radius, where the earth radius and the magnitude of the candidate location's radius are determined from a same reference point, and
  (v) determine the error value by combining the first error value and the second error value.

In some embodiments, the first set of path lengths are determined by the signal processing unit configured to calculate a magnitude of a vector between the candidate location and each position information of the non-geostationary satellite. In some embodiments, the second set of path lengths are determined by the signal processing unit configured to multiply a speed of light by each arrival time of the number of signals, where the number of signals are received from the location of the earth-based vehicle.

In some embodiments, the first error value is obtained by the signal processing unit configured to use a linear combination of the differences between path lengths from the first set of path lengths and corresponding path lengths from the second set of path lengths for each position information of the non-geostationary satellite. In some embodiments, the error value is determined by the signal processing unit configured to: multiply a pre-determined value by the second error value raised to a power of two to obtain a first value, and add the first value to the first error value raised to a power of two to obtain the error value After the processing operation, the signal processing unit selects, from the plurality of candidate locations associated with a plurality of error values, one candidate location having a lowest error value, where the selected candidate location is the determine of the location of the earth-based vehicle. In some embodiments, the selected candidate location provides the determine of the location of the earth-based vehicle in three-dimensions. In some embodiments, the signal processing unit is further configured to store the selected candidate location for the earth-based vehicle.

In some embodiments, the signal processing unit may include a processor and a memory that may include instructions stored thereupon. The instructions upon execution by the processor configure the signal processing unit to perform the operations described in FIGS. 3 and 5 and in the embodiments described in this patent document.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., non-volatile solid state storage drives, magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is what is described and illustrated, including:

1. A system for performing geolocation, comprising:
    a data collection apparatus in a non-geostationary satellite, including a processor configured to:
        receive a number of signals from an earth-based vehicle;
        determine arrival times of the number of signals,
        obtain position information of the non-geostationary satellite corresponding to the arrival times of the number of signals, and
        send, to a signal processing unit, the arrival times and the position information of the non-geostationary satellite for the number of signals;
    wherein the signal processing unit is configured to determine a location of the earth-based vehicle, wherein the signal processing unit is (1) located either (a) in the non-geostational satellite or (b) in a computing system on or near the earth's surface and (2) includes a processor configured to:
        receive the arrival times and the position information of the non-geostationary satellite for the number of signals,
        select a plurality of candidate locations to determine the location of the earth-based vehicle, and
        process the arrival times, the position information, and the plurality of candidate locations to determine the location of the earth-based vehicle by:
            determining, for each candidate location and based on the arrival times and the position information, an error value that represents a proximity between a candidate location and the location of the earth-based vehicle, and
            selecting, from the plurality of candidate locations associated with a plurality of error values, one candidate location having a lowest error value, wherein the selected candidate location is determined as the location of the earth-based vehicle.

2. The system of claim 1, wherein the signal processing unit is located in an aircraft.

3. The system of claim 1, wherein the error value is determined for each candidate location by the signal processing unit by:
    determining a first set of path lengths between the candidate location and each position information of the non-geostationary satellite;
    determining a second set of path lengths between the location of the earth-based vehicle and each position information of the non-geostationary satellite;
    obtaining a first error value based on differences between path lengths from the first set of path lengths and corresponding path lengths from the second set of path lengths for each position information of the non-geostationary satellite;
    obtaining a second error value based on a difference between earth's radius at a latitude and a longitude associated with the candidate location and a magnitude of the candidate location's radius, wherein the earth radius and the magnitude of the candidate location's radius are determined from a same reference point; and
    determining the error value by combining the first error value and the second error value.

4. The system of claim 3, wherein the first set of path lengths are determined by the signal processing unit by calculating a magnitude of a vector between the candidate location and each position information of the non-geostationary satellite.

5. The system of claim 3, wherein the second set of path lengths are determined by the signal processing unit by multiplying a speed of light by each arrival time of the number of signals.

6. The system of claim 3, wherein the first error value is obtained by the signal processing unit by using a linear combination of the differences between path lengths from the first set of path lengths and corresponding path lengths from the second set of path lengths for each position information of the non-geostationary satellite.

7. The system of claim 3, wherein the error value is determined by the signal processing unit by:
  multiplying a pre-determined value by the second error value raised to a power of two to obtain a first value; and
  adding the first value to the first error value raised to a power of two to obtain the error value.

8. The system of claim 1,
  wherein the position information of the non-geostationary satellite is obtained from a global positioning system (GPS) device or from a position determination device located on the non-geostationary satellite, or
  wherein the position information of the non-geostationary satellite is calculated from ephemeris data or ground signal-source information.

9. The system of claim 1, wherein the method implemented by the processor of the signal processing unit further comprises:
  storing the selected candidate location for the earth-based vehicle.

10. The system of claim 1, wherein the number of signals is at least three.

11. The system of claim 1, wherein the selected candidate location provides the determine of the location of the earth-based vehicle in three-dimensions.

12. The system of claim 1, wherein the computing system is located in a stationary platform or in a remote moving platform on the earth's surface.

13. The system of claim 1, wherein the data processing apparatus is configured to perform the determining, the obtaining, or the sending in response to receiving an instruction from a ground-based computing system or from a moving remote platform.

14. A signal processing unit to determine a location of an earth-based vehicle, the signal processing unit (1) being located either (a) in the non-geostational satellite or (b) in a computing system on or near the earth's surface and (2) including a processor to implement a method comprising:
  receiving arrival times and position information of a non-geostationary satellite associated with a number of signals received by the non-geostationary satellite from the earth-based vehicle;
  selecting a plurality of candidate locations to determine the location of the earth-based vehicle; and
  processing the arrival times, the position information, and the plurality of candidate locations to determine the location of the earth-based vehicle by:
    determining, for each candidate location and based on the arrival times and the position information, an error value that represents a proximity between a candidate location and the location of the earth-based vehicle, and
    selecting, from the plurality of candidate locations associated with a plurality of error values, one candidate location having a lowest error value, wherein the selected candidate location is determined as the location of the earth-based vehicle.

15. The signal processing unit of claim 14, wherein the signal processing unit is located in an aircraft.

16. The signal processing unit of claim 14, wherein the error value is determined for each candidate location by the signal processing unit by:
  determining a first set of path lengths between the candidate location and each position information of the non-geostationary satellite;
  determining a second set of path lengths between the location of the earth-based vehicle and each position information of the non-geostationary satellite;
  obtaining a first error value based on differences between path lengths from the first set of path lengths and corresponding path lengths from the second set of path lengths for each position information of the non-geostationary satellite;
  obtaining a second error value based on a difference between earth's radius at a latitude and a longitude associated with the candidate location and a magnitude of the candidate location's radius, wherein the earth radius and the magnitude of the candidate location's radius are determined from a same reference point; and
  determining the error value by combining the first error value and the second error value.

17. The signal processing unit of claim 16, wherein the first set of path lengths are determined by the signal processing unit by calculating a magnitude of a vector between the candidate location and each position information of the non-geostationary satellite.

18. The signal processing unit of claim 16, wherein the second set of path lengths are determined by the signal processing unit by multiplying a speed of light by each arrival time of the number of signals.

19. The signal processing unit of claim 16, wherein the first error value is obtained by the signal processing unit by using a linear combination of the differences between path lengths from the first set of path lengths and corresponding path lengths from the second set of path lengths for each position information of the non-geostationary satellite.

20. The signal processing unit of claim 16, wherein the error value is determined by the signal processing by:
  multiplying a pre-determined value by the second error value raised to a power of two to obtain a first value; and
  adding the first value to the first error value raised to a power of two to obtain the error value.

21. The signal processing unit of claim 14, wherein the method implemented by the processor of the signal processing unit further comprises:
  store the selected candidate location for the earth-based vehicle.

22. The signal processing unit of claim 14, wherein the number of signals is at least three.

23. The signal processing unit of claim 14, wherein the selected candidate location provides the determine of the location of the earth-based vehicle in three-dimensions.

24. The signal processing unit of claim 14, wherein the signal processing unit is located in a computing system in a stationary platform or in a remote moving platform.

* * * * *